(12) United States Patent
Mathias et al.

(10) Patent No.: US 12,064,804 B2
(45) Date of Patent: Aug. 20, 2024

(54) MACHINE HANDLING DEVICE AND METHOD FOR HANDLING AN ELECTRICALLY CONDUCTIVE SHEET-METAL WORKPIECE AND ALSO MACHINE ARRANGEMENT FOR MACHINING SHEET METAL

(71) Applicant: TRUMPF Werkzeugmaschinen SE + Co. KG, Ditzingen (DE)

(72) Inventors: Harald Mathias, Boennigheim (DE); Florian Raichle, Backnang (DE); Frederik Koepp, Muenchingen (DE); Stefan Foerster, Wilthen (DE); Hagen Jacob, Crostau (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 0 days.

(21) Appl. No.: 18/178,572

(22) Filed: Mar. 6, 2023

(65) Prior Publication Data

US 2023/0278093 A1 Sep. 7, 2023

(30) Foreign Application Priority Data

Mar. 7, 2022 (DE) ...................... 10 2022 105 284.2

(51) Int. Cl.
*B21D 43/02* (2006.01)
*B65G 43/08* (2006.01)
(52) U.S. Cl.
CPC ............. *B21D 43/02* (2013.01); *B65G 43/08* (2013.01); *B65G 2203/042* (2013.01)
(58) Field of Classification Search
CPC ...... B21D 43/287; B21D 45/02; B23K 26/38; B23K 2101/18; B25J 19/0095;
(Continued)

(56) References Cited

U.S. PATENT DOCUMENTS

2004/0135590 A1* 7/2004 Quon ................ H01J 37/32183
324/713
2009/0008641 A1* 1/2009 Michimata ........... G01R 27/205
324/693

(Continued)

FOREIGN PATENT DOCUMENTS

DE 102008015948 A1 10/2009
DE 102016124704 A1 6/2017

(Continued)

OTHER PUBLICATIONS

Trumpf Werkzeugmaschinen SE+Co. KG," TruLaser Center 7030, The first full-service laser machine," pp. 1-16, Retrieved from the Internet on Mar. 22, 2023 https://www.trumpf.com/filestorage/TRUMPF Master/Products/Machines and Systems/02 Brochures/TRUMPF-TruLaser-Center-7030-brochure-EN.pdf.

*Primary Examiner* — Gregory W Adams
(74) *Attorney, Agent, or Firm* — LEYDIG, VOIT & MAYER, LTD.

(57) ABSTRACT

A machine handling device for handling a sheet-metal workpiece includes a control device that comprises two sensing elements, and a testing station that includes a testing device configured to test functional capability of the control device. The testing device includes a respective electrically conductive testing-contact body for each of the two sensing elements of the control device. The testing station further includes a testing-evaluation device configured to apply a testing voltage between the respective sensing element and the corresponding testing-contact body. The testing-evaluation device includes a testing-measuring unit and a testing-comparing unit. The testing-measuring unit is configured to measure an actual value of a contact-dependent electrical variable that is dependent on a state of an electrically conducting contact between the sensing element and the testing-contact body. The testing-comparing unit is config- (Continued)

ured to compare the actual value of the contact-dependent electrical variable with a reference value of the contact-dependent electrical variable.

15 Claims, 3 Drawing Sheets

(58) Field of Classification Search
CPC ........ B25J 13/087; B26D 7/18; B26D 7/1863; B26D 7/1818; B26D 2007/1872; B26D 2007/189; B65H 2515/70; G01R 1/0675; G01R 1/06777; G01R 1/07314
See application file for complete search history.

(56) References Cited

U.S. PATENT DOCUMENTS

| | | | |
|---|---|---|---|
| 2009/0143999 A1* | 6/2009 | Karthikeyan | G01R 31/2894 702/58 |
| 2017/0176494 A1 | 6/2017 | Hiew et al. | |
| 2020/0016647 A1 | 1/2020 | Deiss | |

FOREIGN PATENT DOCUMENTS

| | | | | |
|---|---|---|---|---|
| DE | 102017205095 B3 | 6/2018 | | |
| DE | 102018202744 A1 | 8/2019 | | |
| DE | 102018215738 A1 * | 3/2020 | ............ | B23K 26/00 |
| DE | 102019115559 A1 | 12/2020 | | |
| DE | 102019134764 A1 * | 6/2021 | .......... | B25J 15/0052 |
| EP | 1231474 A2 | 8/2002 | | |
| EP | 2616373 B1 | 10/2014 | | |
| EP | 3375576 A1 | 9/2018 | | |
| WO | WO-2009048618 A1 * | 4/2009 | ......... | G01R 31/2889 |

* cited by examiner

MACHINE HANDLING DEVICE AND METHOD FOR HANDLING AN ELECTRICALLY CONDUCTIVE SHEET-METAL WORKPIECE AND ALSO MACHINE ARRANGEMENT FOR MACHINING SHEET METAL

CROSS REFERENCE TO RELATED APPLICATIONS

This application claims benefit to German Patent Application No. DE 10 2022 105 284.2 filed on Mar. 7, 2022, which is hereby incorporated by reference herein.

FIELD

Embodiments of the present invention relate to a machine handling device for handling an electrically conductive sheet-metal workpiece, a machine arrangement for machining sheet metal with the machine handling device, and a method for handling an electrically conductive sheet-metal workpiece that can be carried out by means of the aforementioned machine handling device.

BACKGROUND

The aforementioned machine handling device is used in a sheet-metal fabrication process, in the course of which a sheet-metal workpiece and a residual cut-out sheet surrounding the sheet-metal workpiece are produced by machine-separating a metal sheet mounted on a workpiece support.

SUMMARY

Embodiments of the present invention provide a machine handling device for handling an electrically conductive sheet-metal workpiece. The machine handling device includes a holding unit with holding elements that can be placed by holding element ends on a sheet-metal-workpiece side against a sheet-metal workpiece. The holding element ends on the sheet-metal-workpiece side define a holding element plane of the holding unit. The machine handling device further includes a movement unit for moving the holding unit, and a control device that comprises two sensing elements provided on the holding unit and being offset with respect to one another parallel to the holding element plane of the holding unit. The two sensing elements are electrically conductive. The control device further comprises a control-evaluation device. The two sensing elements form a sensing element pair and have sensing element ends that lie in the holding element plane of the holding unit in a control-sensing position of the sensing elements. The control-evaluation device includes a control-voltage source, a control-measuring unit, and a control-comparing unit. The control-voltage source is configured to apply a control voltage to the two sensing elements of the sensing element pair, with the two sensing elements being arranged in the control-sensing position. With the control voltage being applied to the two sensing elements, the control-measuring unit is configured to measure an actual value of an electrical current flowing as a result of the control voltage between the two sensing elements of the sensing element pair, or an electrical variable dependent thereon. The control-comparing unit is configured to compare the measured actual value of the electrical current or the electrical variable dependent thereon with a reference value. The machine handling device further includes a testing station to which the holding unit can be moved by means of the movement unit of the machine handling device. The testing station comprises a testing device configured to test functional capability of the control device. The testing device includes a respective electrically conductive testing-contact body for each of the two sensing elements of the sensing-element pair of the control device. Each of the two sensing elements of the sensing element pair is capable of being arranged in a testing-sensing position with respect to the testing-contact body. The testing station further includes a testing-evaluation device configured to apply a testing voltage between the respective sensing element arranged in the testing-sensing position and the testing-contact body. The testing-evaluation device includes a testing-measuring unit and a testing-comparing unit. With the testing voltage being applied, the testing-measuring unit is configured to measure an actual value of a contact-dependent electrical variable that is dependent on a state of an electrically conducting contact between the sensing element arranged in the testing-sensing position and the testing-contact body. The testing-comparing unit is configured to compare the measured actual value of the contact-dependent electrical variable with a reference value of the contact-dependent electrical variable that indicates existence of the electrically conducting contact between the sensing element arranged in the testing-sensing position and the testing-contact body.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
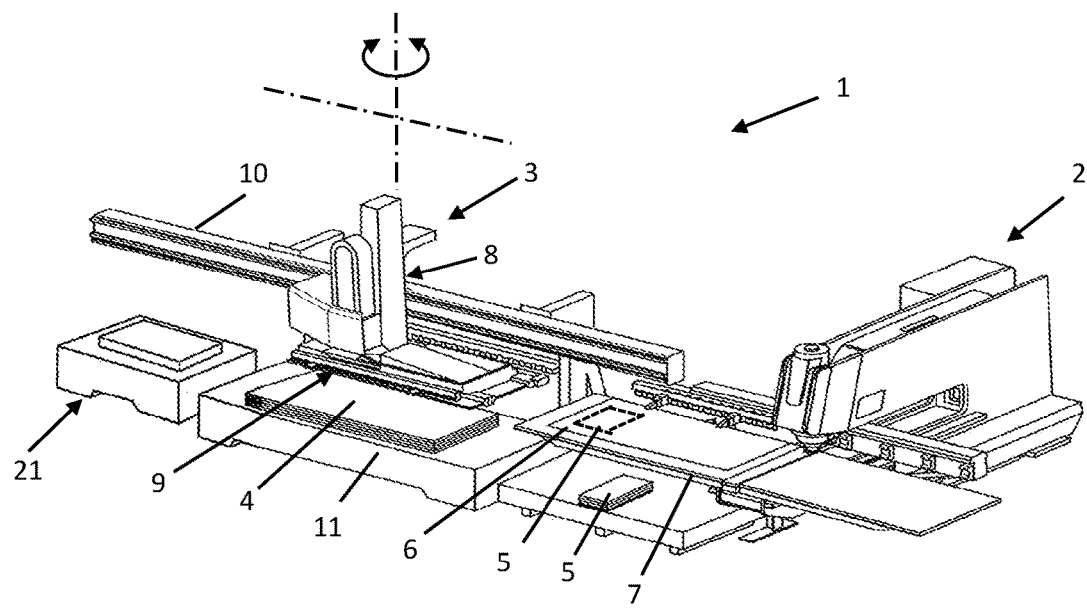
FIG. 1 shows a machine arrangement for machining sheet metal, with a fabrication unit and with a machine handling device for handling sheet-metal workpieces according to embodiments of the present invention.

The aforementioned machine handling device is used in a sheet-metal fabrication process, in the course of which a sheet-metal workpiece and a residual cut-out sheet surrounding the sheet-metal workpiece are produced by machine-separating a metal sheet mounted on a workpiece support. A suction frame with holding elements in the form of suction grippers is provided as the holding unit. Alongside and between the suction grippers, electrically conductive sensing pins of a control device are arranged on the suction frame as sensing elements.

After completion of the separating operation, a lifting device on the underside of the sheet-metal workpiece produced is actuated, in order to lift the sheet-metal workpiece out of the residual cut-out sheet. After the actuation of the lifting device, the suction frame is moved into a takeover position, in which the suction frame is in contact by the free ends of the suction grippers and the sensing pins with the upper side of the sheet-metal workpiece remote from the workpiece support. Subsequently, a voltage is applied to mutally assigned sensing pins. If an electrical current then flows between the sensing pins and the machine ground, this indicates that the sheet-metal workpiece is still connected to the residual cut-out sheet, and is consequently not yet ready for transporting away.

In the case of a complete separation of the sheet-metal workpiece from the residual cut-out sheet, the suction grippers of the suction frame lying against the sheet-metal workpiece are switched to a negative-pressure source and the suction frame is moved out of the takeover position into a target position by means of the movement unit of the handling device. Once the suction frame has left the takeover position, a voltage is once again applied to the mutually assigned sensing pins. Since a sheet-metal workpiece fixed to the suction frame is drawn against the free ends of the sensing pins by the activated suction grippers, a current flowing between the sensing pins after the renewed application of a voltage indicates that a metal sheet is actually fixed to the suction frame, and consequently the transporting away of the sheet-metal workpiece proceeds unproblematically.

Embodiments of the present invention relate to a machine handling device for handling an electrically conductive sheet-metal workpiece,
  with a holding unit with holding elements, which can be placed by holding element ends on the sheet-metal-workpiece side against a sheet-metal workpiece, wherein the holding element ends on the sheet-metal-workpiece side define a holding element plane of the holding unit,
  with a movement unit for moving the holding unit and also
  with a control device, which comprises two sensing elements, which are provided on the holding unit, are offset with respect to one another parallel to the holding element plane of the holding unit and are electrically conductive, and also a control-evaluation device,
    wherein the sensing elements of the control device form a sensing element pair and have sensing element ends which lie in the holding element plane of the holding unit in a control-sensing position of the sensing elements of the sensing element pair,
    wherein the control-evaluation device of the control device has a control-voltage source, a control-measuring unit and also a control-comparing unit,
    wherein, when the sensing elements of the sensing element pair are arranged in the control-sensing position, a control voltage can be applied to the sensing elements of the sensing element pair by means of the control-voltage source of the control-evaluation device,
    wherein, when a control voltage has been applied to the sensing elements of the sensing element pair, an actual value of an electrical current flowing as a result of the control voltage between the sensing elements of the sensing element pair, or an electrical variable dependent thereon, can be measured by means of the control-measuring unit of the-control-evaluation device and
    wherein the measured actual value can be compared with a reference value by means of the control-comparing unit of the control-evaluation device.

It is an object of the present invention to ensure a functionally reliable verification of a process flow provided for handling sheet-metal workpieces. According to embodiments of the present invention, the machine handling device comprises a testing station, to which the holding unit is moved by means of the movement unit of the handling device and at which the functioning capability of the control device of the handling device is checked. The checking of the control device preferably takes place parallel to main time, so that the fabrication process on the machine arrangement according to embodiments of the present invention is not delayed by the checking of the control device. The position of the testing station on the machine arrangement according to embodiments of the present invention is in principle freely selectable. A position at which the checking of the control device does not hinder the other sequences on the machine arrangement according to embodiments of the present invention is preferred. A position close to a unworked-sheet pallet, from which sheets to be machined are fed to the fabrication unit of the machine arrangement according to embodiments of the present invention by means of the handling device according to embodiments of the present invention, comes into consideration as the position for the testing station by way of example.

The testing device arranged at the testing station has a testing-contact body for each of the sensing elements of the sensing element pair of the control device. For testing the functional capability of the control device of the handling device according to embodiments of the present invention, the sensing elements of the sensing element pair are arranged in a testing-sensing position with respect to the testing-contact body before a testing voltage is applied by means of a testing-evaluation device of the testing device to the sensing element arranged in the testing-sensing position and the testing-contact body. After the testing voltage has been applied, an actual value of a contact-dependent electrical variable, the value of which depends on the state of an electrically conducting contact between the sensing element arranged in the testing-sensing position and the testing-contact body, is measured by means of a testing-measuring unit of the testing-evaluation device. The measured actual value is finally compared by means of a testing-comparing unit of the testing-evaluation device with a reference value of the contact-dependent electrical variable, which for its part indicates the existence of an electrically conducting contact between the sensing element arranged in the testing-sensing position and the testing-contact body. Preferably, the control-evaluation device is at least partially used as the testing-evaluation device.

If the actual value of the contact-dependent electrical variable measured by means of the testing device deviates correspondingly clearly from the assigned reference value, this suggests a restricted or even entirely absent electrical conductivity, and consequently a restricted or entirely absent functional capability of the tested sensing element, and consequently of the entire control device. The reason for a restricted or entirely absent functional capability may be in particular operationally induced wear on the tested sensing element. Both the reference values used in the functional testing of the sensing elements and the admissible deviation of the measured actual values of the contact-dependent electrical variable from the assigned reference values may be established empirically.

As the contact-dependent electrical variable, the testing-measuring unit of the testing-evaluation device preferably measures an electrical current and/or an electrical resistance.

The tested sensing elements are in particular components of a control device by means of which the holding unit provided with the sensing elements is tested to ascertain whether a sheet-metal workpiece is fixed on the holding unit by means of the holding elements switched into the functional state. In addition or as an alternative, for example, as in the case of the prior art acknowledged at the beginning, the success of a separating process may also be tested by means of the control device of the handling device according to embodiments of the present invention.

According to embodiments of the present invention, there is the possibility of testing the sensing elements of a sensing element pair one after the other for their functional capability. A single testing-contact body, with respect to which first the one sensing element and then the other sensing element of the sensing element pair is arranged in the testing-sensing position, is sufficient in this case.

In some embodiments of the present invention, to reduce the time of the testing operation, a simultaneous testing of the functional capability of the two sensing elements of a sensing element pair is realized. For this purpose, each of the sensing elements is assigned its own testing-contact body and the testing-contact bodies assigned to the different sensing elements are electrically insulated from one another.

In some embodiments, each of the sensing elements of the sensing element pair of the control device is a sensing element of a sensing-element arrangement with a plurality of parallel-connected sensing elements. The sensing-element arrangements may be tested for their functional capability one after the other on one and the same testing-contact body or simultaneously on a respectively assigned testing-contact body.

The design of the invention according to some embodiments is distinguished by the fact that, in the successive or simultaneous testing, it is not that the functional capability of the sensing-element arrangement(s) as a whole can be tested in each case, but rather that the functional capability of individual sensing elements can be tested. In this way, exactly those sensing elements, if any, that have to be exchanged for functionally capable sensing elements as a result of a restricted or entirely absent functional capability can be identified. Each of the sensing elements of the control device is assigned a testing-contact body unit of the testing-contact body of the testing device. The testing voltage is applied individually to the sensing elements and the respectively assigned testing-contact body unit.

According to some embodiments, for the sake of simplicity the testing voltage is applied to the sensing element or elements and/or to the sensing-element arrangement(s) and the testing-contact body or bodies or the testing-contact body units by providing that the testing-contact body or bodies or the testing-contact body units are connected to ground. The potential at the sensing element or elements and/or at the sensing-element arrangement or arrangements is generated by means of the testing-evaluation device, which for this purpose preferably uses the control-voltage source of the control device.

In a further preferred refinement, the sensing elements are arranged in the testing-sensing position, that is to say are placed against the assigned testing-contact body or the assigned testing-contact body unit, by means of the movement unit of the handling device.

The handling device according to embodiments of the present invention is intended for applications in the case of which an electrically conductive sheet-metal workpiece which has an electrically nonconducting film on a side facing the holding unit is to be handled. In order that the sensing elements of the control device can come into contact with the sheet-metal workpiece, the sensing elements have sensing-element tips which in a regular state are able to penetrate the film provided on the sheet-metal workpiece. The testing-contact body or bodies or the testing-contact body units of the testing device for testing the functional capability of the control device of the handling device are provided on the side assigned to the sensing element or the sensing elements of the control device with an electrically nonconducting testing film which has the characteristics, in particular the strength, of the film on the sheet-metal workpiece. In the testing-sensing position, the sensing elements are applied by their free ends against the assigned testing-contact body or the assigned testing-contact body unit. As a result of being applied, sensing elements which are in a regular state penetrate the testing film with the sensing-element tips and come into direct contact with the assigned testing-contact body or with the assigned testing-contact body unit through the testing film. Sensing elements that are considerably worn at their tips, and consequently because of which the functional capability of the control device of the handling device is at least restricted, cannot penetrate the testing film, or not sufficiently, in the testing-sensing position, and therefore cannot come into an electrically sufficiently conductive contact with the assigned testing-contact body or the assigned testing-contact body unit. The actual value of the contact-dependent electrical variable that is measured after a testing voltage has been applied then differs significantly from the assigned reference value and thereby indicates the irregular state of the sensing element or the sensing-element arrangement.

According to some embodiments, in successive testings of the functional capability of the control device of the handling device, the testing-contact body or bodies or the testing-contact body units of the testing device are provided with one and the same testing film on the side assigned to the sensing element or the sensing elements of the control device and that, when testing on the testing film following a previous testing, the sensing element or the sensing elements in the testing-sensing position is/are offset as compared with the position during the previous testing. In this way, the consumption of testing film is minimized.

To automate the sequences in the functional testing of the sensing elements or sensing-element arrangements, according to some embodiments, a device for covering the testing-contact body or bodies or the testing-contact body units with the testing film is provided. Said device has a testing-film renewal device, by means of which a testing film covering the testing-contact body or bodies or the testing-contact body units can be removed from the testing-contact body or bodies or the testing-contact body units as used testing film after a testing of the functional capability of the control device and can be replaced by a new testing film.

Preferably, in this case, before a testing of the functional capability of the control device of the handling device, a new testing film is unwound from a testing-film storage roller by means of the testing-film renewal device and is fed to the testing-contact body or bodies or the testing-contact body units. After a testing of the functional capability of the control device, the testing-film renewal device is used to remove the used testing film from the testing-contact body or bodies or the testing-contact body units and to replace it with the new testing film by unwinding the new testing film from the testing-film storage roller.

In some embodiments of the present invention, an offset of the sensing element or elements with respect to the position during a previous testing or the replacement of a testing film by a new testing film is only envisaged if the functional capability of the sensing elements has been established during the previous testing, and accordingly the testing film has been damaged by the sensing element or elements.

According to FIG. 1, a machine arrangement 1 for machining sheet metal comprises a fabrication unit in the form of a conventional combination punch-laser machine 2 and also a machine handling device 3 as an automation unit for the combination punch-laser machine 2.

On the combination punch-laser machine 2, in a separating fabrication process sheet-metal workpieces 5 and a residual cut-out sheet 6 remaining after machining are produced from an unworked sheet 4 consisting of electrically conductive material.

In the same way as the sheet-metal workpieces 5 and the residual cut-out sheet 6 produced from them, the unworked sheets 4 are provided on the upper side with a conventional film of electrically nonconducting material that is not specifically shown in FIG. 1.

By means of the handling device 3, a workpiece support 7 of the combination punch-laser machine 2 is loaded and unloaded.

For this purpose, a movement unit 8 of the handling device 3 is provided with a holding unit in the form of a suction plate 9. The suction plate 9 is specifically shown in FIG. 2, and in this case is shown in the view of its workpiece side.

As indicated in FIG. 1 by dash-dotted lines, the suction plate 9 can be raised and lowered in a known way on the movement unit 8 and can be moved together with the movement unit 8 in the horizontal direction along a guide rail 10 of the handling device 3. Furthermore, the suction plate 9 can be rotated about its vertical movement axis in relation to the movement unit 8.

For loading the workpiece support 7 of the combination punch-laser machine 2, the handling device 3 takes over an unworked sheet 4 from a stack of unworked sheets deposited on an unworked-sheet pallet 11. With the suction plate 9 and the unworked sheet 4 held on it, the movement unit 8 moves out of the position according to FIG. 1 along the guide rail 10 into a position above the workpiece support 7 of the combination punch-laser machine 2. By lowering the suction plate 9, the unworked sheet 4 is then deposited on the workpiece support 7.

Figure 2:
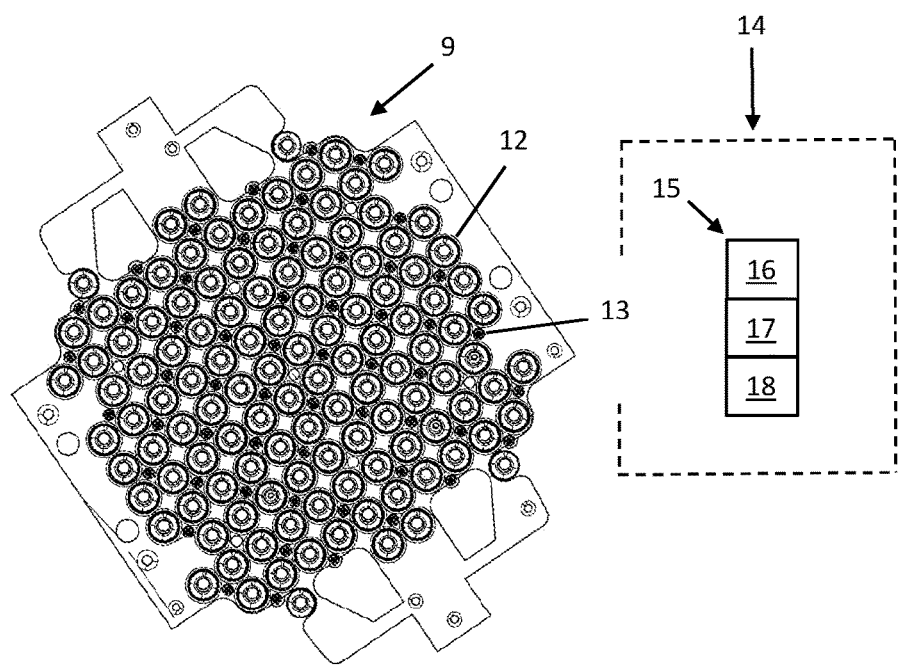
FIG. 2 shows a suction plate of the machine handling device according to FIG. 1 in the view of the workpiece side of the suction plate according to some embodiments.

For fixing the unworked sheet 4, the suction plate 9 is provided with holding elements in the form of conventional suction grippers 12 (FIG. 2). The workpiece-side ends of the suction grippers 12 lie in a common holding element plane of the suction plate 9.

Between and laterally alongside the suction grippers 12, sensing elements designed as electrically conductive sensing pins 13 are arranged on the suction plate 9. In this case, the sensing pins 13 are offset with respect to one another parallel to the holding element plane of the suction plate 9. The free ends of the sensing pins 13 are designed as conical sensing-pin tips, which taper to a point at the free ends of the sensing pins 13.

After the transfer of the unworked sheet 4 to the workpiece support 7 of the combination punch-laser machine 2, the suction plate 9 is moved by means of the movement unit 8 into a waiting position laterally alongside the workpiece support 7. This is then followed by the separating-machining by means of the machining devices of the combination punch-laser machine 2 of the unworked sheet 4 deposited on the workpiece support 7.

The sheet-metal workpieces 5 produced by the separating-machining of the unworked sheet 4 are removed one after the other from the workpiece support 7 by means of the handling device 3 and are deposited on a finished-part stack.

For receiving a sheet-metal workpiece 5, the suction plate 9 is moved by means of the movement unit 8 out of the waiting position beside the workpiece support 7 into a position above the sheet-metal workpiece 5 to be unloaded. Subsequently, the suction plate 9 is lowered to the sheet-metal workpiece 5 mounted on the workpiece support 7, until the suction grippers 12 come to lie against the upper side of the sheet-metal workpiece 5. Thereby, the suction grippers 12 are placed by their ends on the sheet-metal-workpiece side on the sheet-metal workpiece 5 via the film arranged between the ends of the suction grippers 12 and the sheet-metal workpiece 5. If a negative pressure is then applied to the suction grippers 12 in the accustomed way, the suction grippers 12 constrict and, if the unloading operation proceeds unproblematically, the suction grippers 12 draw the sheet-metal workpiece 5 against the free ends of the sensing pins 13 protruding from the suction plate 9. The sensing pins 13 are then in a control-sensing position on the sheet-metal workpiece 5. If the free ends of the sensing pins 13 are sufficiently pointed, the sensing-pin tips penetrate the film applied to the sheet-metal workpiece 5 and thereby come into direct contact with the electrically conductive sheet-metal workpiece 5.

The sensing pins 13 are part of a control device 14 of the handling device 3 (FIG. 2). With the aid of the control device 14, it is checked whether a sheet-metal workpiece 5 to be transported away from the workpiece support 7 of the combination punch-laser machine 2 is actually fixed to the suction plate 9 by means of the suction grippers 12 switched into the functional state.

Figure 3:
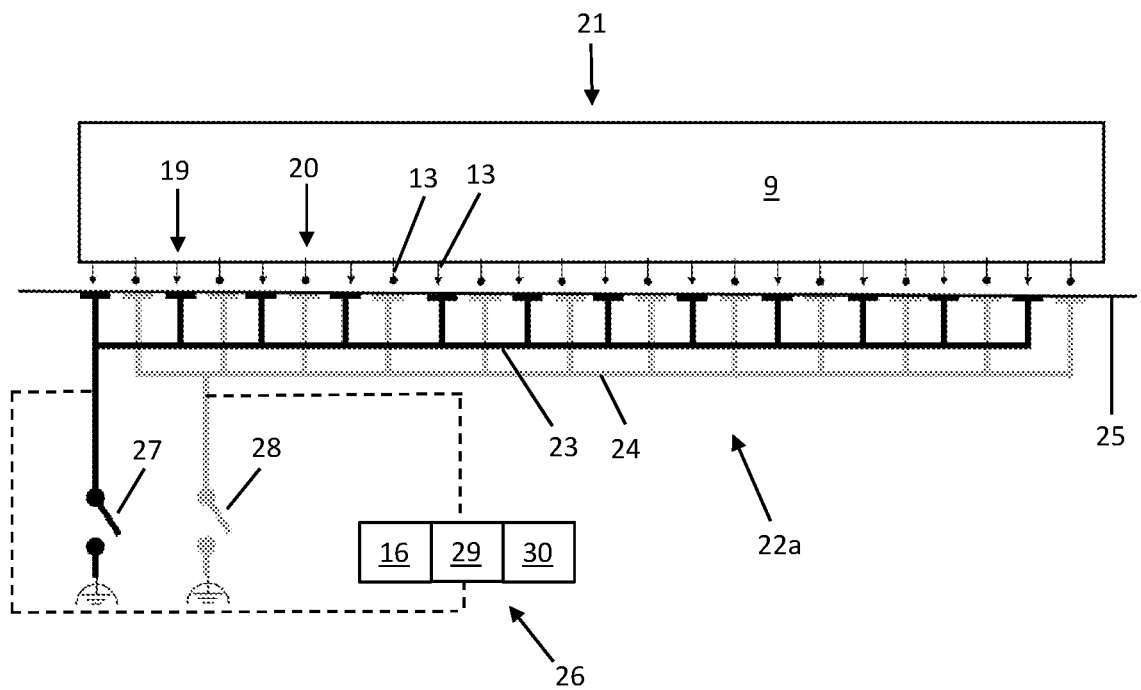
FIG. 3 shows a testing station of the machine handling device according to FIG. 1, with a first design of a testing device for testing the functional capability of a control device of the machine handling device according to some embodiments.
Figure 4:
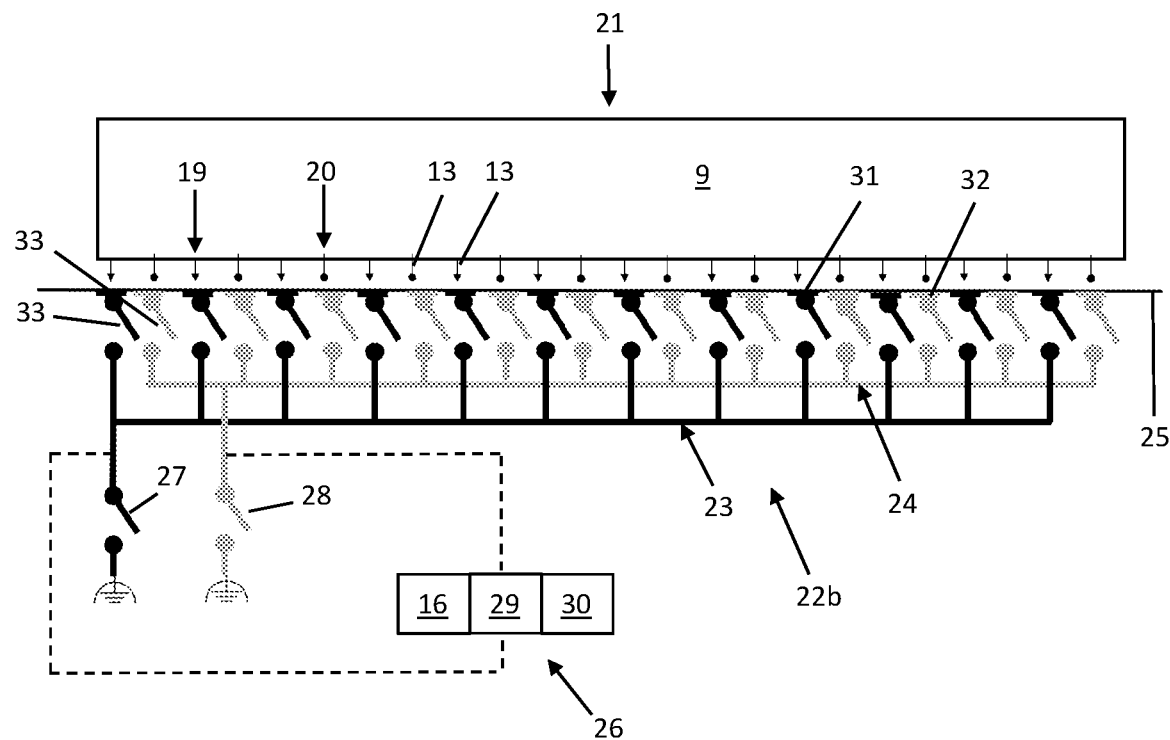
FIG. 4 shows the testing station according to FIG. 3, with a second design of a testing device for testing the functional capability of the control device of the machine handling device according to some embodiments.

FIGS. 3 and 4 show the suction plate 9 at a testing station 21 of the handling device 3 that is specifically described below.

The sensing pins 13 on the suction plate 9 are distributed between two sensing-element or sensing-pin arrangements 19, 20, wherein the sensing pins 13 of each of the sensing-pin arrangements 19, 20 are connected in parallel. On the suction plate 9, the sensing-pin arrangements 19, 20 are electrically insulated from one another. In this way, the sensing-pin arrangements 19, 20 are an arrangement pair.

In FIGS. 3 and 4, the sensing-pin arrangements 19, 20 are shown highly schematically. In FIGS. 3 and 4, the sensing pins 13 of the sensing-pin arrangement 19 are provided with an arrow tip, while the sensing pins 13 of the sensing-pin arrangement 20 have a circle at the end. The suction grippers 12, which are likewise provided on the suction plate 9, are not shown in FIGS. 3 and 4 for the sake of overall clarity.

The control device 14 comprises in addition to the sensing pins 13 a control-evaluation device 15, which for its part has a control-voltage source 16, a control-measuring unit 17 and also a control-comparing unit 18 (FIG. 2).

On the workpiece support 7 of the combination punch-laser machine 2, after the sheet-metal workpiece 5 has been drawn against the sensing-pin tips of the sensing pins 13, a control voltage is applied to the sensing-pin arrangements 19, 20 by means of the control-voltage source 16 of the control-evaluation device 15.

After the control voltage has been applied, the control-measuring unit 17 of the control-evaluation device 15 measures the actual value of an electrical current flowing between the sensing-pin arrangements 19, 20. In the control-comparing unit 18 of the control-evaluation device 15, the measured actual value of the electrical current is compared with a reference value, here the reference value zero.

Given functionally capable, that is to say sufficiently pointed, sensing pins 13 of the sensing-pin arrangements 19, 20, if a value other than zero is measured as the actual value of the electrical current, this indicates that an electrically conductive sheet-metal workpiece 5 is fixed to the suction plate 9 and that accordingly the unloading of the sheet-metal workpiece 5 from the workpiece support 7 of the combination punch-laser machine 2 has proceeded unproblematically.

During operation, in particular the sensing-pin tips of the sensing pins 13 are subjected to wear. As a consequence, the sensing-pin tips of the sensing pins 13 may become worn to the extent that the sensing pins 13 are no longer able to penetrate the film on the upper side of the sheet-metal workpieces 5 to be unloaded from the workpiece support 7. Functionally reliable checking of the suction plate 9 for sheet-metal workpieces 5 fixed to it is not possible with sensing pins 13 that are restricted in their functional capability in such a way.

To ensure a permanently functionally reliable control check of the suction plate 9 for sheet-metal workpieces 5 fixed to it, the handling device 3 has the testing station 21 shown highly schematically in FIGS. 3 and 4 and also in FIG. 1. As evidenced by FIG. 1, the testing station 21 in the case of the example shown is in the direct proximity of the unworked-sheet pallet 11.

Arranged at the testing station 21 is a testing device by means of which the functional capability of the control device 14 of the handling device 3 is tested at regular time intervals. A testing device 22a of a first design is shown in FIG. 3. FIG. 4 shows a testing device 22b of a second design.

According to FIG. 3, the testing device 22a has an electrically conductive testing-contact body 23 for the sensing-pin arrangement 19 and an electrically conductive testing-contact body 24 for the sensing-pin arrangement 20. Each of the sensing pins 13 of the sensing-pin arrangement 19 is assigned an area of the testing-contact body 23 and each of the sensing pins 13 of the sensing-pin arrangement 20 is assigned an area of the testing-contact body 24.

The testing-contact bodies 23, 24 are electrically insulated from one another. The upper side of the testing-contact bodies 23, 24 that is facing the sensing-pin arrangements 19, 20 is covered by a testing film 25.

The testing film 25 coincides in essential characteristics with the film adhering to the upper side of the unworked sheet 4 and the sheet-metal workpieces 5. In particular, the testing film 25 has the same material strength as the film on the unworked sheets 4 and the sheet-metal workpieces 5. Furthermore, the testing film 25 is also electrically nonconducting.

For testing the functional capability of the control device 14 of the handling device 3, the suction plate 9 is moved by means of the movement unit 8 to the testing station 21 and is lowered there by the free ends of the sensing pins 13 of the sensing-pin arrangements 19, 20 onto the upper side of the testing-contact bodies 23, 24. As a result, the sensing pins 13 of the sensing-pin arrangements 19, 20 adopt a testing-sensing position with respect to the testing-contact bodies 23, 24. In the testing-sensing position, the sensing pins 13 are applied against the testing-contact bodies 23, 24.

If the sensing pins 13 of the sensing-pin arrangements 19, 20 are in a functional state, i.e. the sensing-pin tips of the sensing pins 13 are not worn, or only insignificantly, the sensing-pin tips of the sensing pins 13 arranged in the testing-sensing position penetrate the testing film 25 and thereby come into direct contact with the testing-contact bodies 23, 24.

After the transfer of the sensing pins 13 of the sensing-pin arrangements 19, 20 into the testing-sensing position, a testing voltage is applied by means of a testing-evaluation device 26 of the testing device 22a on the one hand to the sensing-pin arrangement 19 and the testing-contact body 23 assigned to it and on the other hand to the sensing-pin arrangement 20 and the testing-contact body 24 assigned to it.

For this purpose, the sensing-pin arrangements 19, 20 are connected to the control-voltage source 16 of the control device 14 then used as part of the testing-evaluation device 26. The testing-contact bodies 23, 24 are connected to ground by closing a switch 27 or a switch 28.

When sensing pins 13 of the sensing-pin arrangements 19, 20 are arranged in the testing-sensing position and the testing voltage has been applied, it is then measured by means of a testing-measuring unit 29 of the testing-evaluation device 26 for each of the sensing-pin arrangements 19, 20 whether an electrical current is flowing as a result of the applied testing voltage. The actual value of the electrical current measured by means of the testing-measuring unit 29 is compared in a testing-comparing unit 30 of the testing-evaluation device 26 for each of the sensing-pin arrangements 19, 20 with a reference value which indicates the existence of an electrically conducting contact between the sensing pins 13 of the sensing-pin arrangements 19, 20 and the respectively assigned testing-contact body 23, 24. If the measured actual value of the electrical current does not deviate from the reference value, or only slightly, this suggests that at least some of the sensing pins 13 of the sensing-pin arrangement 19 or of the sensing-pin arrangement 20 are functional and are accordingly able to penetrate the testing film 25, and consequently also the film on the sheet-metal workpieces 5. The control-measuring unit 17 is preferably used as the testing-measuring unit 29; the control-comparing unit 18 is preferably provided as the testing-comparing unit 30. The testing-evaluation device 26 or the control-evaluation device 15 is at least partially incorporated in particular in the suction plate 9.

The testing device 22b according to FIG. 4 differs from the testing device 22a according to FIG. 3 in that on the testing device 22b the sensing pins 13 of the sensing-pin arrangements 19, 20 can be individually tested for their functional capability. For this purpose, each sensing pin 13 of the sensing-pin arrangement 19 is assigned a testing-contact body unit 31 of the testing-contact body 23 and each sensing pin 13 of the sensing-pin arrangement 20 is assigned a testing-contact body unit 32 of the testing-contact body 24, and the testing-contact body units 31, 32 are electrically insulated from one another. Furthermore, in addition to the switch 28 or 29, a switch 33 must also be actuated for connecting each of the testing-contact body units 31, 32.

Once the switches 27, 28 are closed, the functional capability of the sensing pin 13 assigned to the respective testing-contact body unit 31, 32 can be tested by closing the switch 33 assigned to the relevant testing-contact body unit 31, 32. If the tip of the sensing pin 13 is not worn, or not significantly, the sensing-pin tip penetrates the testing film 25 and, under the effect of the voltage applied to the testing pin 13 and the assigned testing-contact body unit 31 or 32, an electrical current flows, the actual value of which is measured by means of the testing-measuring unit 29 and is subsequently compared with the associated reference value in the testing-comparing unit 30.

Figure 5:
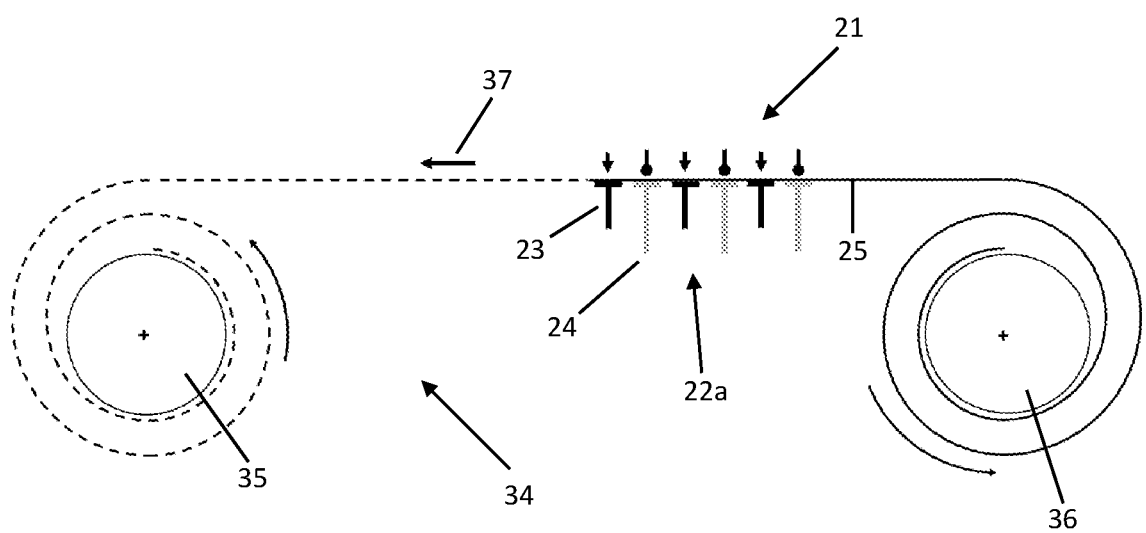
FIG. 5 shows the testing station according to FIG. 3, with a testing-film renewal device according to some embodiments.

FIG. 5 shows the testing device 22a according to FIG. 3 with a testing-film renewal device 34 that is not shown in FIG. 3. Before the beginning of testing of the functional capability of the control device 14, a testing film 25 is arranged over the testing-contact bodies 23, 24, covering them completely, by means of the testing-film renewal device 34. After completion of the testing, the testing film 25 previously acted upon by the sensing pins 13 of the sensing-element arrangements 19, 20, and possibly perforated by the sensing-pin tips, is removed from the testing-contact bodies 23, 24 as used testing film 25 and is replaced by a new testing film 25, which once again completely covers the testing-contact bodies 23, 24.

For this purpose, a new testing film 25 is unwound from a testing-film storage roller 36 by means of a motor-driven conveying roller 35 of the testing-film renewal device 34 and is fed to the testing-contact bodies 23, 24.

To minimize the consumption of testing film 25, in the case of the example shown it is also possible not to completely replace a testing film 25 completely covering the testing-contact bodies 23, 24 after ending a testing of the functional capability of the control device 14 for a subsequent testing, but to move it on in an advancing direction 37 of the testing-film renewal device 34 just until a region of the testing film 25 that was not affected by the sensing pins 13 in the previous testing covers the testing-contact bodies 23, 24 where the sensing pins 13 are arranged in the subsequent testing of the functional capability of the control device 14.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A machine handling device for handling an electrically conductive sheet-metal workpiece, the machine handling device comprising:

a holding unit with holding elements that can be placed by holding element ends on a sheet-metal-workpiece side against a sheet-metal workpiece, wherein the holding element ends on the sheet-metal-workpiece side define a holding element plane of the holding unit, a movement unit for moving the holding unit, and a control device that comprises two sensing elements provided on the holding unit and being offset with respect to one another parallel to the holding element plane of the holding unit, wherein the two sensing elements are electrically conductive, the control device further comprises a control-evaluation device, wherein the two sensing elements of the control device form a sensing element pair and have sensing element ends that lie in the holding element plane of the holding unit in a control-sensing position of the two sensing elements of the sensing element pair, wherein the control-evaluation device of the control device comprises a control-voltage source, a control-measuring unit, and a control-comparing unit, wherein, with the two sensing elements of the sensing element pair being arranged in the control-sensing position, the control-voltage source is configured to apply a control voltage to the two sensing elements of the sensing element pair, wherein, with the control voltage being applied to the two sensing elements of the sensing element pair, the control-measuring unit is configured to measure an actual value of an electrical current flowing as a result of the control voltage between the two sensing elements of the sensing element pair, or an electrical variable dependent thereon, and wherein the control-comparing unit is configured to compare the measured actual value of the electrical current or the electrical variable dependent thereon with a reference value, the machine handling device further comprising a testing station, wherein the movement unit of the machine handling device is configured to move the holding unit to the testing station, wherein the testing station comprises a testing device configured to test functional capability of the control device, wherein the testing device comprises an electrically conductive testing-contact body for each of the two sensing elements of the sensing-element pair of the control device, wherein each of the two sensing elements of the sensing element pair is capable of being arranged in a testing-sensing position with respect to the testing-contact body, wherein the testing station further comprises a testing-evaluation device configured to apply a testing voltage between the respective sensing element arranged in the testing-sensing position and the testing-contact body, wherein the testing-evaluation device comprises a testing-measuring unit and a testing-comparing unit, wherein, with the testing voltage being applied, the testing-measuring unit of the testing-evaluation device is configured to measure an actual value of a contact-dependent electrical variable that is dependent on a state of an electrically conducting contact between the sensing element arranged in the testing-sensing position and the testing-contact body, and wherein the testing-comparing unit of the testing-evaluation device is configured to compare the measured actual value of the contact-dependent electrical variable with a reference value of the contact-dependent electrical variable that indicates existence of the electrically conducting contact between the sensing element arranged in the testing-sensing position and the testing-contact body.

2. The machine handling device as claimed in claim 1, wherein
- each sensing element of the sensing element pair is assigned a corresponding electrically conductive testing-contact body of the testing device that is electrically insulated from the other testing-contact body assigned to the other sensing element,
- the two sensing elements of the sensing element pair are capable of being arranged simultaneously in the testing-sensing position with respect to the respectively assigned testing-contact body,
- wherein the testing-evaluation device is configured to apply a testing voltage between the sensing elements arranged in the testing-sensing position and the respectively assigned testing-contact body,
- wherein with the testing voltage being applied, the testing-measuring unit of the testing-evaluation device is configured to measure an actual value of a contact-dependent electrical variable that is dependent on the state of an electrically conducting contact between the sensing elements arranged in the testing-sensing position and the respectively assigned testing-contact body, and
- wherein the testing-comparing unit of the testing-evaluation device is configured to compare the measured actual value of the contact-dependent electrical variable with a reference value of the contact-dependent electrical variable that indicates existence of an electrically conducting contact between the sensing elements arranged in the testing-sensing position and the respectively assigned testing-contact body.

3. The machine handling device as claimed in claim 1, wherein:
- each of the two sensing elements of the sensing element pair of the control device is a sensing element of a sensing-element arrangement with a plurality of parallel-connected sensing elements,
- with the sensing elements being arranged in the control-sensing position, the control-voltage source of the control-evaluation device is configured to apply a control voltage to the sensing-element arrangements, and
- at the testing station, the testing device is configured to test the functional capability of the control device of the handling device,
- an electrically conductive testing-contact body of the testing device is provided for each of the sensing-element arrangements,
- with the sensing elements being arranged in the testing-sensing position, the testing-evaluation device is configured to apply a testing voltage to the sensing-element arrangement and the testing-contact body,
- with a testing voltage being applied, the testing-measuring unit of the testing-evaluation device is configured to measure an actual value of a contact-dependent electrical variable that is dependent on the state of an electrically conducting contact between the sensing-element arrangement and the testing-contact body, and
- the testing-comparing unit of the testing-evaluation device is configured to compare the measured actual value of the contact-dependent electrical variable with a reference value of the contact-dependent electrical variable that indicates existence of an electrically conducting contact between the sensing-element arrangement and the testing-contact body.

4. The machine handling device as claimed in claim 3, wherein:
- each sensing-element arrangement of the sensing-element arrangements of the control device is assigned its own electrically conductive testing-contact body of the testing device that is electrically insulated from the testing-contact body assigned to the other sensing-element arrangement,
- at least one sensing element of the one sensing-element arrangement is capable of being arranged simultaneously with at least one sensing element of the other sensing-element arrangement in a testing-sensing position with respect to the respectively assigned testing-contact body,
- with the sensing elements being arranged in the testing-sensing position, the testing-evaluation device is configured to apply a testing voltage to the sensing-element arrangements and the respectively assigned testing-contact body,
- with the testing voltage being applied, the testing-measuring unit of the testing-evaluation device is configured to measure an actual value of a contact-dependent electrical variable that is dependent on the state of an electrically conducting contact between the sensing-element arrangements and the respectively assigned testing-contact body, and
- the testing-comparing unit of the testing-evaluation device is configured to compare the actual value of the contact-dependent electrical variable with a reference value of the contact-dependent electrical variable that indicates existence of an electrically conducting contact between the sensing-element arrangements and the respectively assigned testing-contact body.

5. The machine handling device as claimed in claim 3, wherein:
- the testing-contact body or at least one of the testing-contact bodies is/are designed as a testing-contact body arrangement comprising testing-contact body units that are electrically conductive and electrically insulated from one another, and of which one testing-contact body unit is assigned to one of the sensing elements of the sensing-element arrangements,
- the sensing elements of each of the sensing-element arrangements are capable of being arranged simultaneously in a testing-sensing position with respect to the respectively assigned testing-contact body unit,
- the testing-evaluation device is configured to apply a testing voltage individually to each of the sensing elements arranged in the testing-sensing position and the assigned testing-contact body unit,
- with the testing voltage being applied, the testing-measuring unit of the testing-evaluation device is configured to measure an actual value of a contact-dependent electrical variable that is dependent on a state of an electrical conducting contact between the sensing element and the assigned testing-contact body unit, and
- the testing-comparing unit of the testing-evaluation device is configured to compare the measured actual value of the contact-dependent electrical variable with a reference value of the contact-dependent electrical variable that indicates the existence of an electrically conducting contact between the sensing element arranged in the testing-sensing position and the assigned testing-contact body unit.

6. The machine handling device as claimed in claim 1, wherein:
a testing voltage is capable of being applied to the sensing element arranged in the testing-sensing position and the testing-contact body by providing that the testing-contact body is capable of being connected to ground, or
a testing voltage is capable of being applied to the sensing elements arranged in the testing-sensing position and the respectively assigned testing-contact body by providing that the testing-contact body is capable of being connected to the ground, or
a testing voltage is capable of being applied to the sensing-element arrangement and the testing-contact body by providing that the testing-contact body is capable of being connected to the ground, or
a testing voltage is capable of being applied to the sensing-element arrangements and the respectively assigned testing-contact body by providing that the testing-contact body is capable of being connected to the ground, or
a testing voltage is capable of being applied individually to each of the sensing elements arranged in the testing-sensing position and the assigned testing-contact body unit by providing that the testing-contact body unit is capable of being connected to the ground.

7. The machine handling device as claimed in claim 1, wherein:
the holding elements of the holding unit are capable of being switched in a controlled manner into a functional state, wherein, by means of the holding elements being switched into the functional state, the sheet-metal workpiece is capable of being fixed on the holding unit while extending in the holding element plane, and
the control device of the handling device is configured to check as the state of the holding unit, whether the sheet-metal workpiece is fixed on the holding unit by means of the holding elements being switched into the functional state, wherein the sensing elements of the sensing element pair can be arranged in the control-sensing position when the holding elements of the holding unit have been switched into the functional state.

8. The machine handling device as claimed in claim 1, wherein the sensing elements are capable of being arranged in the testing-sensing position by the movement unit of the handling device.

9. The machine handling device as claimed in claim 1, wherein the testing-measuring unit of the test-evaluation device is configured to measure an electrical current and/or an electrical resistance as the contact-dependent electrical variable.

10. The machine handling device as claimed in claim 1, wherein:
the handling device is designed for handling an electrically conductive sheet-metal workpiece that is provided with an electrically nonconducting film on a side facing the holding unit,
the holding elements of the holding unit are capable of being placed by the holding element ends on the sheet-metal-workpiece side against the sheet-metal workpiece via the film arranged between the holding element ends and the sheet-metal workpiece,
the sensing element ends of the sensing elements of the control device of the handling device are designed as sensing-element tips configured to penetrate the film,
the testing-contact body or the test-contact bodies or the testing-contact body units of the testing device for testing the functional capability of the control device of the handling device are provided on the side assigned to the sensing element or the sensing elements of the control device with an electrically nonconducting testing film that has characteristics of the film with which the sheet-metal workpiece is provided, and
in the testing-sensing position, the sensing elements are applied by the sensing-element tips against the testing-contact body or testing-contact bodies or the testing-contact body units.

11. The machine handling device as claimed in claim 10, wherein,
in successive testings of the functional capability of the control device of the handling device, the testing-contact body or the testing-contact bodies or the testing-contact body units of the testing device are provided with one and the same testing film on the side assigned to the sensing element or the sensing elements of the control device, and
when testing following a previous testing, the sensing element or the sensing elements in the testing-sensing position can be arranged on the testing film offset as compared with the position during the previous testing.

12. The machine handling device as claimed in claim 10, further comprising a device for covering the testing-contact body or the testing-contact bodies or the testing-contact body units with the testing film, wherein the device comprises a testing-film renewal device configured to remove a testing film covering the testing-contact body or the testing-contact bodies or the testing-contact body units from the testing-contact body or the testing-contact bodies or the testing-contact body units as used testing film after a testing of the functional capability of the control device, and/or to replace the testing film by a new testing film.

13. The machine handling device as claimed in claim 12, wherein the testing-film renewal device is configured to,
before a testing of the functional capability of the control device of the handling device, unwound a new testing film from a testing-film storage roller and feeding the new testing film to the testing-contact body or the testing-contact bodies or the testing-contact body units, and
after the testing of the functional capability of the control device, remove the used testing film from the testing-contact body or the testing-contact bodies or the testing-contact body units, and/or replace the used testing film with the new testing film by unwinding the new testing film from the testing-film storage roller.

14. A machine arrangement for machining sheet metal, the machine arrangement comprising:
a fabrication unit for separating an electrically conductive sheet-metal workpiece from a metal sheet and/or for machining an electrically conductive sheet-metal workpiece, and
a machine handling device for handling the electrically conductive sheet-metal workpiece as claimed in claim 1.

15. A method for handling an electrically conductive sheet-metal workpiece, the method comprising:
placing holding elements of a holding unit by holding element ends on a sheet-metal-workpiece side against the sheet-metal workpiece, wherein the holding element ends on the sheet-metal-workpiece side define a holding element plane of the holding unit, moving the holding unit using a movement unit, and using a control device, wherein the control device comprises two sensing elements provided on the holding unit and being offset with respect to one another parallel to the holding element plane of the holding unit, the two sensing elements are electrically conductive, the control device further comprises a control-evaluation device, wherein the sensing elements of the control device form a sensing element pair and have sensing element ends that are arranged in the holding element plane of the holding unit in a control-sensing position of the sensing elements of the sensing element pair, with the sensing elements of the sensing element pair being arranged in the control-sensing position, applying a control voltage to the sensing elements of the sensing element pair using a control-voltage source of the control-evaluation device, with the control voltage being applied to the sensing elements of the sensing element pair, measuring an actual value of an electrical current flowing as a result of the control voltage between the sensing elements of the sensing element pair, or an electrical variable dependent thereon, using a control-measuring unit of the control-evaluation device, comparing the measured actual value with a reference value using a control-comparing unit of the control-evaluation device, arranging the holding unit at a testing station of the handling device using the movement unit of the handling device, and at the testing station, testing the functional capability of the control device of the handling device using a testing device, by:

providing an electrically conductive testing-contact body of the testing device for each of the sensing elements of the sensing-element pair of the control device, arranging each of the sensing elements of the sensing element pair in a testing-sensing position with respect to the testing-contact body, applying a testing voltage to the sensing element arranged in the testing-sensing position and the testing-contact body using a testing-evaluation device, with a testing voltage being applied, measuring an actual value of a contact-dependent electrical variable that is dependent on a state of an electrically conducting contact between the sensing element arranged in the testing-sensing position and the testing-contact body using a testing-measuring unit of the testing-evaluation device, and comparing, using a testing-comparing unit of the test-evaluation device, the measured actual value of the contact-dependent electrical variable with a reference value of the contact-dependent electrical variable that indicates existence of an electrically conducting contact between the sensing element arranged in the testing-sensing position and the testing-contact body.

* * * * *